United States Patent Office 2,773,378
Patented Dec. 11, 1956

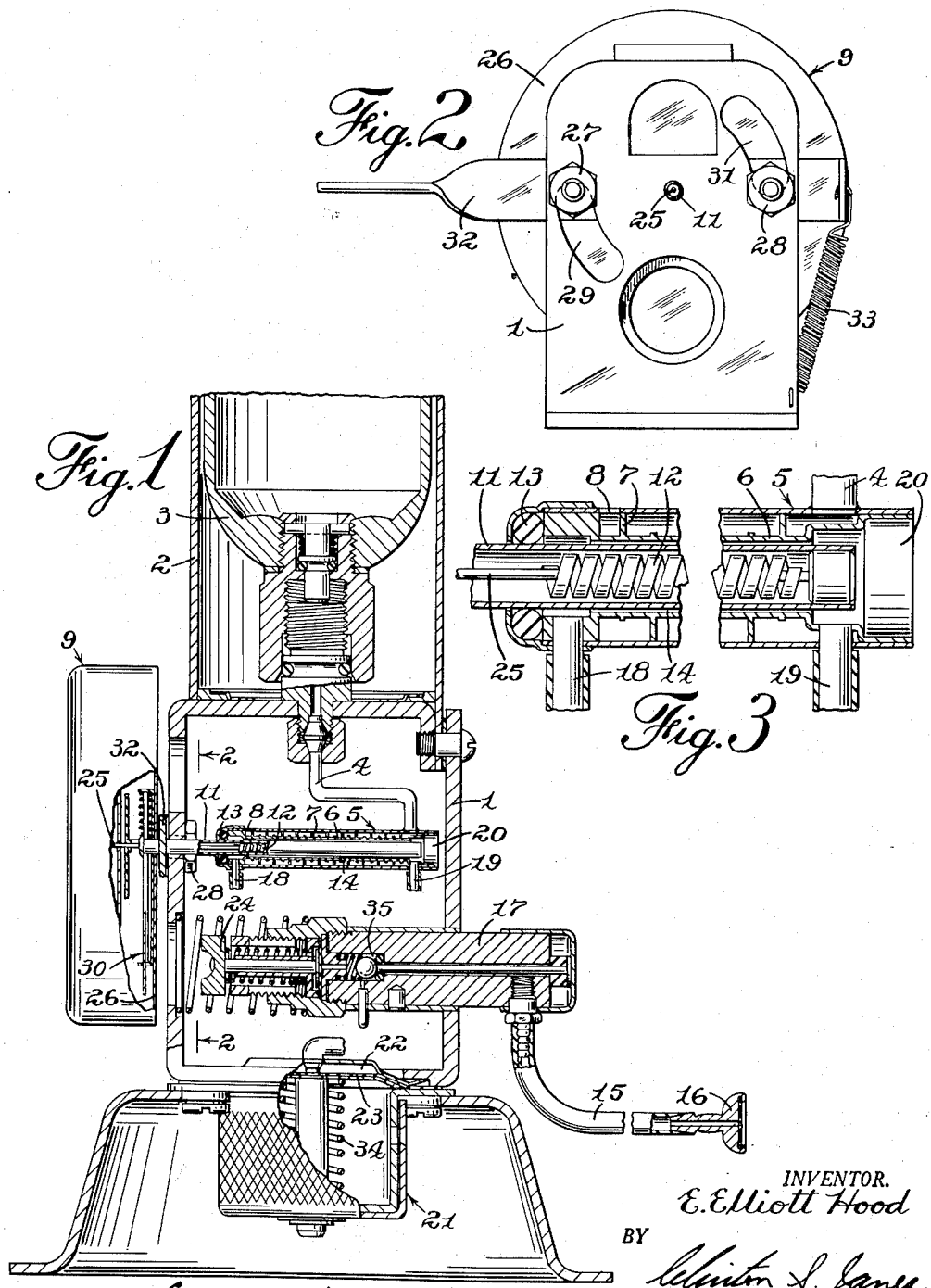

2,773,378

FREEZEMETER

E. Elliott Hood, Elmira, N. Y., assignor to Bendix Aviation Corporation, a corporation of Delaware Application July 27, 1953, Serial No. 370,366

2 Claims. (Cl. 73—17)

The present invention relates to a freeze-point test meter, and more particularly to an instrument for determining the freezing point of arctic coolants for internal combustion engines.

Two of the most important problems encountered in the production of a satisfactory field instrument for testing arctic coolant liquids are, first, the time lag between a change in temperature of the sample and the corresponding indication by the thermometer, and second, the tendency of very concentrated solutions to supercool, that is to remain in the liquid state until cooled substantially below the actual thawing point of the sample.

The first problem has been attacked by locating the heat-sensitive element of the thermometer as close to the sample and with as good thermal conducting relation as possible; while the solution of the second problem has been sought through various methods of agitation and/or crystal seeding of the sample.

It is an object of the present invention to provide a novel freeze-point test meter for arctic coolants for internal combustion engines incorporating means for improving the accuracy of indication of the critical temperature.

It is another object to provide such a device incorporating means for agitating the sample, more particularly where it is in contact with the surface of the thermometer.

It is another object to provide such a device having unitary means for promoting heat transfer between the sample and thermometer, and for preventing supercooling of the sample.

Further objects and advantages will be apparent from the following description taken in connection with the accompanying drawing in which:

Fig. 1 is a vertical, substantially mid-sectional view of a preferred embodiment of the invention;

Fig. 2 is a section taken substantially on the line 2—2 of Fig. 1; and

Fig. 3 is an enlarged sectional detail of portions of the thermometer stem, sample holder and frost tube, showing the manner of sealing the sample holder while permitting rotation of the thermometer stem.

In Fig. 1 of the drawing there is illustrated a frame or standard 1 having a cylindrical holder 2 for a flask 3 containing a freezing medium such as liquefied carbon dioxide under pressure. The outlet of the flask 3 is connected by a conduit 4 to a heat exchanger 5 comprising an inner frost tube 6 around which the expanded carbon dioxide gas and snow mixture is caused to follow a labyrinthine path by virtue of a baffle system 7, the gas being permitted to escape at a terminal port 8.

A thermometer 9 having a smooth cylindrical stem 11 is mounted on the frame 1 with its stem loosely traversing the frost tube 6 of the heat exchanger 5. As best shown in Fig. 3, the portion of the thermometer stem containing the heat sensitive element 12 is maintained in co-axial relation to the frost tube 6 by bearing and packing means here shown in the form of a ring 13 of suitable elastically deformable material located in one end of the frost tube 6. The space 14 around the thermometer stem 11 within the frost tube is closed at the opposite end of the tube by means of a sealing member 20, thus forming a chamber which holds the liquid sample in direct contact with the thermometer stem.

Means for introducing a sample of the liquid to be frozen into said space 14 is provided comprising a flexible sampling tube 15 having an inlet fitting 16 and connected through a tubular plunger 17 and conduit 18 to one end of the frost tube 6. The opposite end of the frost tube is connected by a conduit 19 to a rotary pump structure 21 which includes a chamber 22 closed by a flexible diaphragm 23, the retraction of which draws the sample of liquid into and through the frost tube 6 so as to fill the space 14. The plunger 17 carries at its inner end a permanent magnet 24 which is adapted to operate a device indicated generally by numeral 30 for arresting the thermometer needle 25 to record the thawing point of the sample.

Since the sampling means and the magnetic arresting means 30 for the thermometer are fully shown and described in the patent to Dickey et al., 2,635,458, issued April 21, 1953, assigned to the assignee of the present application, and form no part of the present invention, further description thereof is deemed unnecessary.

According to the present invention, the stated objects are accomplished first by maintaining the liquid sample in direct contact with the stem 11 of the thermometer to facilitate the transfer of heat therebetween, and secondly, by the provision of means for manually oscillating the thermometer stem during the freezing process to accelerate said heat transfer and to agitate the liquid to promote crystallization when the freezing point is reached. For this purpose, the thermometer dial casing 26 is mounted on the frame 1 with provision for limited rotary movement as by means of studs 27, 28 traversing arcuate slots 29, 31 in the frame as illustrated in Fig. 2. A handle 32 is rigidly mounted on the dial casing 26 in any suitable manner, and a spring 33 is attached at its ends to the handle 32 and an anchorage on the frame 1 so as to normally maintain the thermometer in the position illustrated. It will be understood that this normal position of the thermometer is such as to bring the arresting means 30 into juxtaposition with the actuating magnet 24 on the plunger 17.

In operation, after a sample of the liquid to be tested has been drawn into the space 14 within the frost tube 6 by manipulation of the pump 21, carbon dioxide gas and snow is admitted to the heat exchanger 5 through the conduit 4, thus rapidly cooling the sample in the frost tube. During this cooling operation, the thermometer 9 is maintained in rotary oscillation by manipulation of the handle 32, whereby the thermometer stem is maintained substantially at the temperature of the surrounding sample, and the sample is agitated to prevent supercooling. When the sample has solidified, the flow of carbon dioxide is stopped, and the pump 21 manipulated to permit its spring 34 to apply pressure to the diaphragm 23 tending to eject the sample liquid. When the sample in the frost tube thaws sufficiently for it to flow under said pressure, the hydraulic pressure so set up in the chamber 35 of plunger 17 releases the magnet 24 to cause arrest of the thermometer needle, all as fully described in the patent to Dickey et al., above cited.

Although but one form of the invention has been shown and described in detail, it will be understood that changes may be made in the precise form and arrangement of parts without departing from the spirit of the invention.

I claim:

1. In a freeze-test meter for arctic coolants for internal combustion engines, a thermometer having a movable indicating element and a cylindrical stem containing its heat-sensitive element, a frost tube of slightly larger internal diameter than the external diameter of the thermometer stem, surrounding the portion of said stem containing the heat-sensitive element, means including packing means for closing the space between the thermometer stem and the frost tube and maintaining the tube and stem in coaxial relation to provide a sample holder while permitting relative rotation thereof, means for introducing a sample of the liquid to be tested into the space surrounding the thermometer stem within the frost tube, means for cooling said tube below the freezing point of the sample, and means for accelerating the transfer of heat through the sample and for promoting solidification of the sample by oscillating the thermometer stem in the frost tube; including further a frame, means for rotatably mounting the thermometer in the frame, means for defining the normal position of the thermometer in the frame and yielding means urging the thermometer toward its normal position.

2. A freeze-point test meter as set forth in claim 1 including further means operative when the thermometer is in normal position responsive to transmission of hydraulic pressure through the sample of liquid to arrest the indicating element of the thermometer.

References Cited in the file of this patent

UNITED STATES PATENTS

| | | |
|---|---|---|
| 1,443,537 | Hortvet | Jan. 30, 1923 |
| 1,629,711 | Klopsteg et al. | May 24, 1927 |
| 2,243,733 | Ford | May 27, 1941 |
| 2,343,372 | Ford et al. | Mar. 7, 1944 |
| 2,633,736 | Dickey | Apr. 7, 1953 |